United States Patent [19]

Sisk

[11] Patent Number: 5,676,404
[45] Date of Patent: Oct. 14, 1997

[54] LOW PROFILE FLANGED TEE

[76] Inventor: David E. Sisk, 7353 Hillsboro Rd., Bonne Terre, Mo. 63628

[21] Appl. No.: 598,602

[22] Filed: Feb. 12, 1996

[51] Int. Cl.⁶ .................................................. F16L 9/14
[52] U.S. Cl. ................................. 285/156; 285/121
[58] Field of Search ........................... 285/156, 121

[56] References Cited

U.S. PATENT DOCUMENTS

| | | |
|---|---|---|
| D. 283,265 | 4/1986 | Preskey et al. . |
| D. 291,480 | 8/1987 | Vassallo et al. . |
| D. 297,678 | 9/1988 | Sisk . |
| D. 358,202 | 5/1995 | Sisk . |
| 1,255,562 | 2/1918 | Olson .......................... 285/156 |
| 1,767,226 | 6/1930 | Pearson ..................... 285/156 X |
| 1,992,960 | 3/1935 | Miller et al. .............. 285/156 X |
| 2,039,542 | 5/1936 | Lindquist ...................... 285/156 |
| 2,470,499 | 5/1949 | Lapp ........................... 285/156 X |
| 3,183,023 | 5/1965 | Morrison ..................... 285/156 |
| 3,245,725 | 4/1966 | Wildman, Jr. . |
| 4,047,741 | 9/1977 | Pertriaux . |
| 4,160,559 | 7/1979 | Nickels ........................ 285/156 |
| 4,848,396 | 7/1989 | Sisk ............................ 251/366 X |
| 4,889,318 | 12/1989 | Sisk . |
| 5,104,155 | 4/1992 | Kirkwood ................... 285/156 |
| 5,387,015 | 2/1995 | Sisk .............................. 285/55 |

FOREIGN PATENT DOCUMENTS

| | | |
|---|---|---|
| 535591 | 12/1958 | Belgium ...................... 285/156 |
| 1189550 | 6/1985 | Canada ........................ 285/156 |
| 666368 | 6/1979 | U.S.S.R. ...................... 285/156 |
| 28708 | of 1910 | United Kingdom . |
| 2227536 | 8/1990 | United Kingdom ....... 285/156 |
| 4001712 | 1/1994 | WIPO .......................... 285/156 |

*Primary Examiner*—Dave W. Arola
*Attorney, Agent, or Firm*—Paul M. Denk

[57] ABSTRACT

A one piece, low-profile hopper tee is provided having a transverse, elongated hollow pipe section with an inlet opening formed at a midpoint in the top side and an integral flange formed around the inlet opening for attaching the hopper tee to an outlet end of a hopper. The distance from the longitudinal axis of the elongated hollow pipe to the top of the flange is not greater than 1.25 times the distance from the longitudinal axis of the elongated pipe section to the top surface of the elongated pipe section. There are wear saddles formed on each side of the flange between the flange and the elongated pipe section. The elongated pipe section has an inner diameter that is uniform at each and gradually increases to the midpoint so as to create a ramp from the inlet opening into the hollow pipe at the area of the wear saddles to facilitate flow of material into the pipe. An alternative embodiment of the low profile hopper tee includes an outflow opening in the bottom side of the elongated pipe and a swing-away door to seal the opening. The low profile swing-away door has a recessed central gasket for sealing the outflow opening when the door is in place.

6 Claims, 6 Drawing Sheets

LOW PROFILE FLANGED TEE

BACKGROUND OF THE INVENTION

This invention relates generally to hopper tees and, more specifically, to a low-profile hopper tee that provides additional ground clearance when attached to a hopper.

Hoppers or tank trailers commonly are used to transport bulk commodities such as industrial and food products. When the hopper or tank trailer reaches its destination, the bulk commodity is unloaded. Typically this is done by pneumatically unloading the bulk commodity from the hopper into a clean and sanitary pipe line. For this purpose, hopper tees are mounted to the discharge outlet of the hopper truck. The hopper tee conventionally has a vertical section and a horizontal section forming the tee configuration. To transfer the bulk commodity, the material is moved out of the hopper by gravity flow or air pressure vibration into the vertical section of the hopper tee. The clean discharge pipe is connected to the horizontal section of the tee. Pneumatic conveyance of the material through the pipe is accomplished by establishing a pressure differential in the pipe.

Prior art hopper tees have been constructed by welding vertical and horizontal pipe sections together. Such tees are prone to excessive internal wear and failure. Previously I have addressed such problems of wear. My U.S. Pat. No. 4,848,396 discloses a cast hopper tee designed to provide a smooth and uninterrupted internal transitional surface. That patent also provides for such an improvement in a bottom drop hopper tee. My U.S. Pat. No. 5,387,015 provides for a hopper tee having an elliptical opening and a pair of wear saddles creating double wall thicknesses at the transition areas between the vertical and horizontal pipes.

Figure 8:
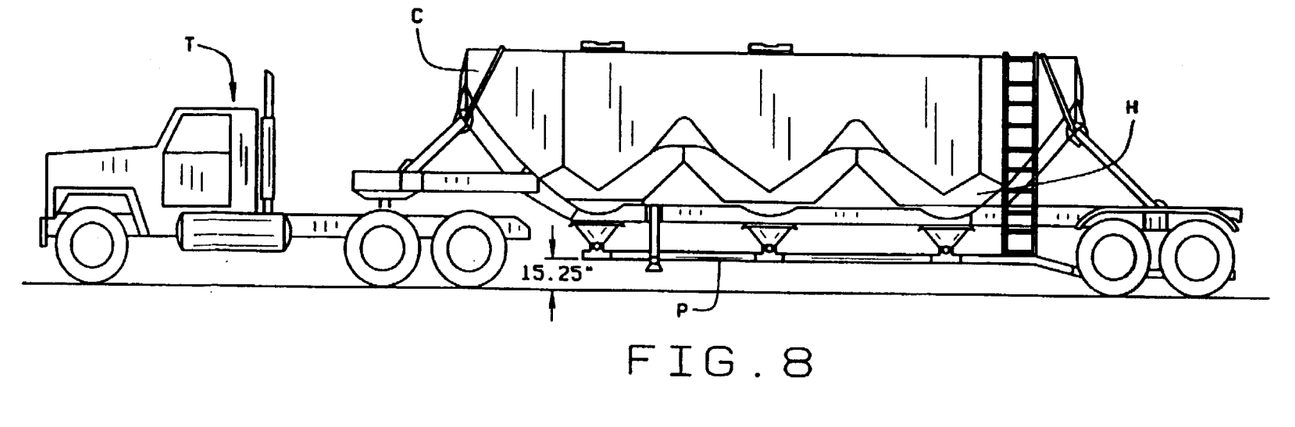
FIG. 8 is a side elevational view of a truck with a hopper trailer employing a plurality of prior art hopper tees.

Although my prior art hopper tees function well for their intended purposes, there are several problems associated with the prior art hopper tees. The prior art hopper tees are formed as a complete, one piece unit having a vertical section and a horizontal section and are designed to fit on the bottom of pneumatic tank trailers. The valve and the hopper tee are bolted to a flange. Some prior art hopper tees do not afford proper ground clearance. Ground clearance has been a problem in the tank industry for years. There are established heights, widths and lengths the tanks must meet by Department of Transportation (DOT) specifications. When the hauler is handling light density products, such as plastic pellets, he needs a larger cubic foot capacity to haul a maximum payload and make hauling such products economically feasible. To increase the cubic foot capacity and still stay within DOT height, width and length standards, drop the bottom of the hopper and increase capacity. However, the bottom of the hopper must be designed with angled walls (angle of repose) that funnel down to the hopper tee to allow for emptying. For most dry bulk products the angle of repose needs to be approximately 45° to obtain the maximum cubic foot capacity while remaining within the mandated dimensions. Since the hopper tee is mounted below the tank it is obvious that ground clearance problems can arise. For example, when crossing railroad tracks or other uneven surfaces, every inch of ground clearance is important. As shown in FIG. 8, typical clearance between the hopper tee and connected pipe and the ground is approximately 15¼ inches.

In the past, tank manufacturers have tried a 30° angle of repose, however, such hoppers do not unload well. Some manufacturers use a hopper having a 45° angle of repose down to the aeration devices and then change the angle to 30° to gain a few inches in ground clearance.

It would be advantageous, therefore, to have a hopper tee, either standard or bottom drop, that has a low profile and can be attached to a hopper having either a 30 degree or 45 degree angle of repose to increase the ground clearance over the typical 15¼ inch clearance.

SUMMARY OF THE INVENTION

It is among the principal objects of the present invention to provide a low profile hopper tee that, when attached to the discharge opening of a hopper, increases the clearance between the hopper tee and the ground over the clearance provided by prior art hopper tees.

It is also among the objects of the present invention to provide such a low profile hopper tee in a standard and a bottom drop configuration.

Another object of the invention is to provide such a low profile hopper tee having no internal welds to interfere with flow through the hopper tee.

Still another object of the invention is to provide such a low profile hopper tee having reinforced transition areas to prevent premature wear.

Yet another object of the invention is to provide a low profile hopper tee wherein the distance from the horizontal axis of the transverse hollow pipe to the top surface of the flange is no more than 1.25 time the distance from the horizontal axis of the transverse hollow pipe to the top surface of the transverse hollow pipe.

Still another object of the invention is to provide such a low profile hopper tee which is economical to manufacture, easy to install and use, and well suited for its intended purposes.

Another object is to provide a 9% to 10% greater clearance for the bottom of the tee above the ground.

In accordance with the invention, generally stated, a integral one piece low profile hopper tee is provided having a generally transversely extending hollow pipe section with opposite free ends capable of being attached to pipeline tubing through which pneumatic unloading of product in the hopper truck may be routed. There is an inlet opening formed centrally in the top side of the transverse hollow pipe section. There is a laterally outwardly directed flange on a top side of the transverse hollow pipe, surrounding the inlet opening, for attachment to the bottom of the hopper. There is a slight internal angle of transition between the inlet opening and the transverse hollow pipe as well as a smooth, uninterrupted internal transition surface between the inlet opening and the interior of the transverse hollow pipe. The distance between the longitudinal axis of the transverse hollow pipe and the top surface of the flange is no greater that 1.25 times the distance between the longitudinal axis of the transverse hollow pipe and the top surface of the transverse hollow pipe. There is a wear saddle formed between the flange and the transverse hollow pipe one each side of the flange to prevent premature wear at the transition point. In another embodiment of the low profile hopper tee, the hopper tee has a drop bottom to allow discharge of the material through the bottom of the hopper tee.

The provision of the flange adjacent the top side of the transverse hollow pipe with a slight internal angle of transition reinforced by wear saddles reduces the overall height of the hopper tee and allows for addition ground clearance between the bottom of the hopper tee and the roadway or other structures of approximately 1½ inches in the first embodiment and approximately ¾ inch in the drop bottom embodiment.

BRIEF DESCRIPTION OF THE DRAWINGS

Corresponding reference figures indicate corresponding elements throughout the various drawings.

DESCRIPTION OF THE PREFERRED EMBODIMENT

Figure 1:
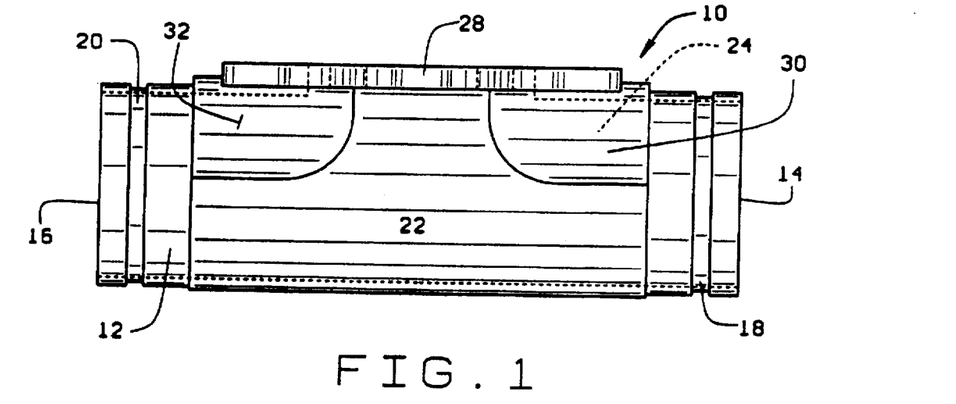
FIG. 1 is a side elevational view of the low profile hopper tee of the present invention.

A cast hopper tee constructed in accordance with the present invention is indicated generally by reference numeral 10. Cast hopper tee includes a horizontal pipe section 12. Pipe section 12 is generally horizontally directed and has first outlet end 14 and a second outlet end 16. The outer surface of each outlet end has grooves 18 and 20 formed therein for the attachment to pipe line tubing (shown as P in FIG. 8) by suitable means. Pipe section 12 has a generally cylindrical wall 22 having a generally cylindrical internal chamber 24. The diameter of the internal chamber 24 of the transverse pipe is approximately one-half the width of the mounting flange, as will be explained below. There is a generally circular opening 26 in the top side of cylindrical wall 22 at a midpoint between the first and second outlet end. The size of opening 26 may be varied to accommodate the discharge opening in a hopper. A flange 28 surrounds the circular opening 26. It will be appreciated that flange 28 is substantially flush with the top side of cylindrical wall 22. It will be noted from FIG. 2 that the distance D1 between the central longitudinal axis of pipe 12 to the top surface of the flange is no greater than 1.25 times the distance D2 from the longitudinal axis of chamber 24 to the top surface of pipe 12 at the respective outlet openings. This ratio imparts a novel low profile aspect to hopper tee, that will be explained in greater detail below. Also the bottom surface of the flange is preferably located at or within the outside diameter of the cylindrical wall 22.

Figure 2:
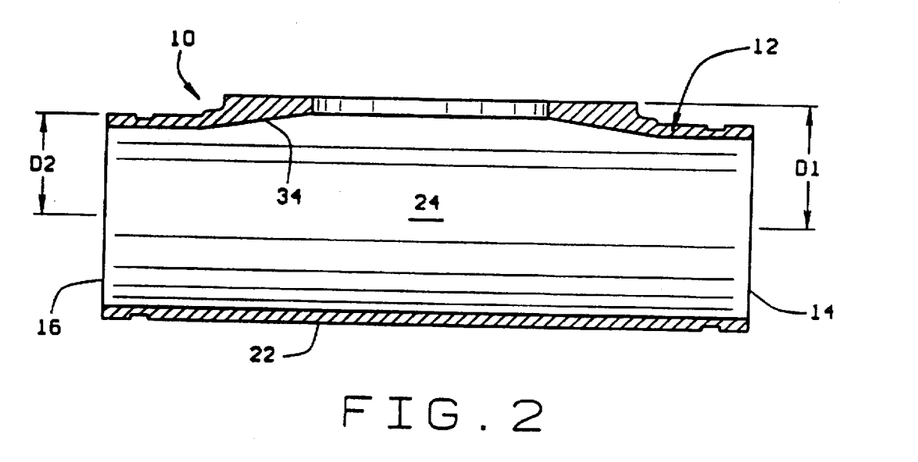
FIG. 2 is a cross-sectional view of the low profile hopper tee of the present invention taken along line 2—2 of FIG. 3.

A pair of integral wear saddles 30 and 32 are formed between the horizontal pipe and the flange. The saddles 30 and 32 straddle the lateral juncture of the flange and the pipe. As best seen in FIG. 2, wear saddles 30 and 32 effectively increase the thickness of wall 22 at the junctures. FIG. 2 also illustrates the internal structure of hopper tee 10. As can be seen, Flange 28 is an integral part of the top side of cylindrical wall 22. Further, it can be seen that the diameter of internal chamber 24 is generally uniform adjacent the out let ends. However, the diameter increases gradually from the edge of flange 28 toward circular opening 26. The increased diameter at the area below the flanges results from a substantially cylindrical ramp 34 formed in the interior face of wall 22 that slopes up from approximately adjacent the distal edges of the wear saddles to the peripheral edge of opening 26. There is a smooth transition between the opening and the interior face of wall 22. It will be appreciated that the presence of the ramp effectively increases the area into which product can be discharge and facilitates smooth and even flow of materials through opening 26 into chamber 24.

Figure 4:
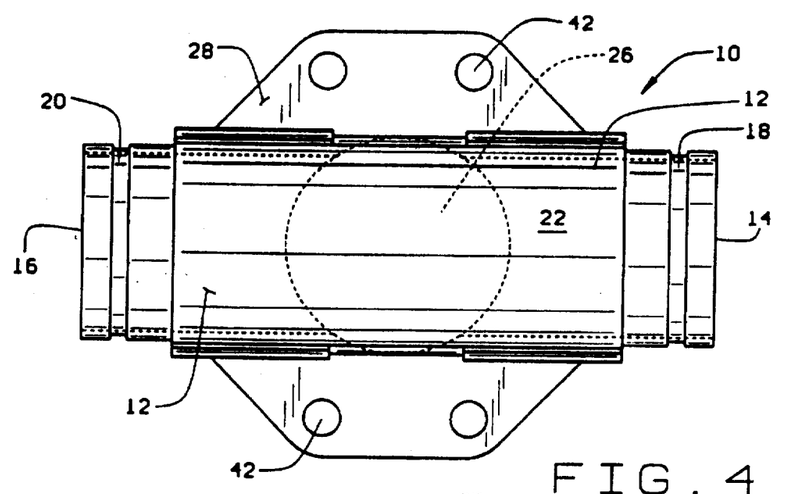
FIG. 4 is a bottom plan view thereof.
Figure 5:
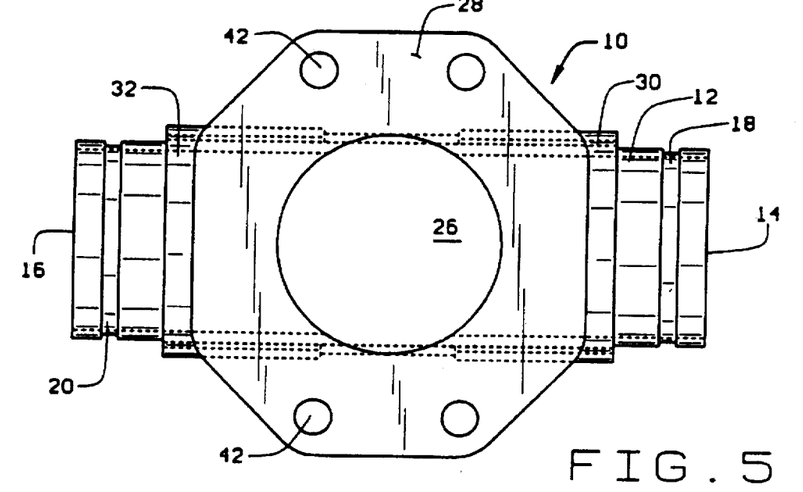
FIG. 5 is a top plan view thereof.

Flange 28 is seen in greater detail in FIGS. 4 and 5. In the embodiment shown, flange 28 is a relative flat plate, octagonal in configuration and dimension to appropriately attach to the discharge side of a conventional butterfly valve assembly, indicated generally by the reference numeral 40 in the figures. It will be appreciated that the width of flange 28 is approximately twice the inner diameter of pipe 12, as stated above. Flange 28, as illustrated, has a plurality of mounting holes 42 formed therethrough for the insertion of bolts or other appropriate attaching means to connect the hopper tee to the butterfly valve. Although the flange is shown having a generally octagonal shape with four mounting holes 42 formed therethrough, it will be appreciated that the flange can have any shape that is required for attachment to a butterfly valve.

Figure 3:
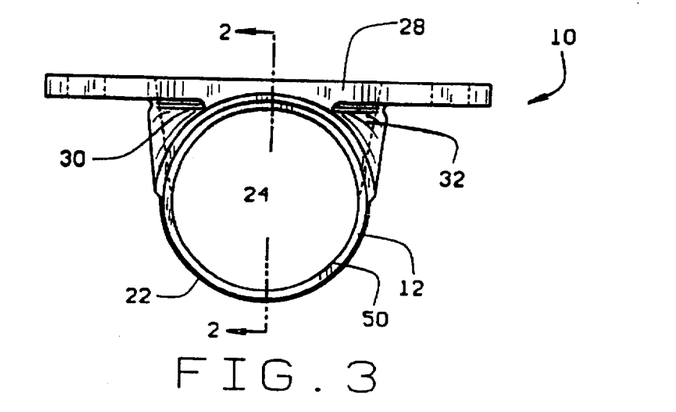
FIG. 3 is an end plan of the low profile hopper tee of the present invention.

As shown in FIG. 3, hopper tee 10 can include an inner molded lining 50. The inner molded liner 50 preferably is made from a urethane elastomer that is molded in-situ within east hopper tee 10. A supplemental mold is located within horizontal pipe 12 and then urethane is injection molded in place. The liner has a low coefficient of friction and provides a very smooth transitional liner between opening 26 and chamber 24 and prevents hangup of any product during flow through the hopper tee.

Figure 6:
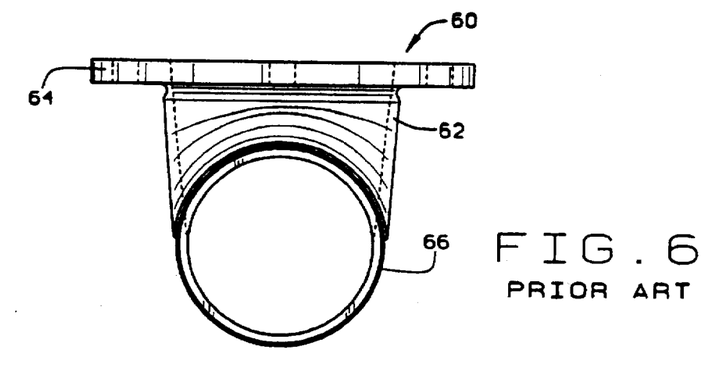
FIG. 6 is an end plan of a prior art hopper tee.
Figure 7:
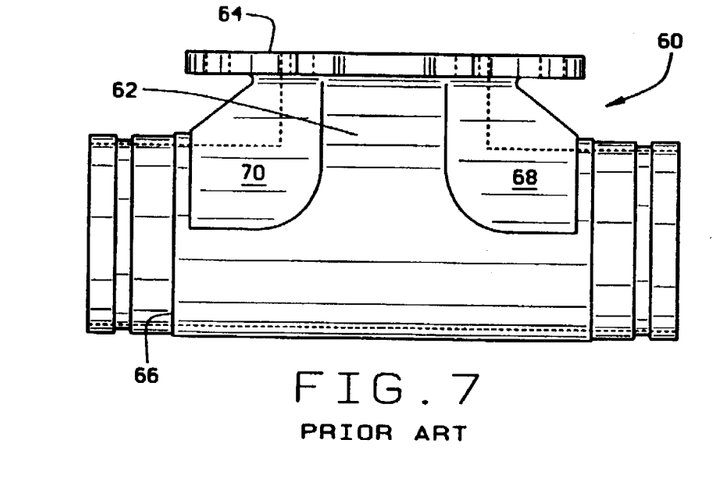
FIG. 7 is a side elevational view of the prior art hopper tee.

The low profile hopper tee 10 is specifically different from prior art hopper tees as will now be described. A prior art hopper tee is indicated in the drawings by reference numeral 60. Hopper tee 60 includes a first or vertical hollow pipe section 62 having a generally outwardly directed flange 64 at the upper end. A second or horizontal pipe section 66 extends generally traverse relative to the vertical hollow pipe section. This particular embodiment of a prior art hopper tee has pair of integral wear saddles 68 and 70 are formed from the wails of the respective pipe sections. The saddles 68 and 70 straddle the lateral juncture of the respective pipe sections.

Figure 9:
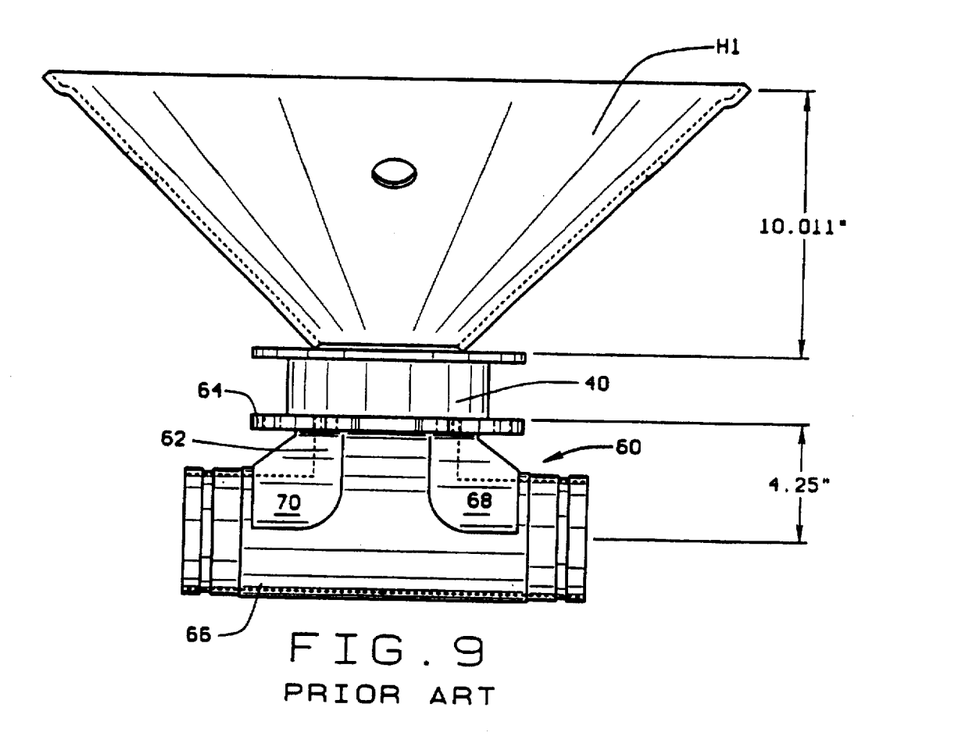
FIG. 9 is front elevational view of a prior art hopper tee attached to the outlet end of a conventional hopper cone.
Figure 10:
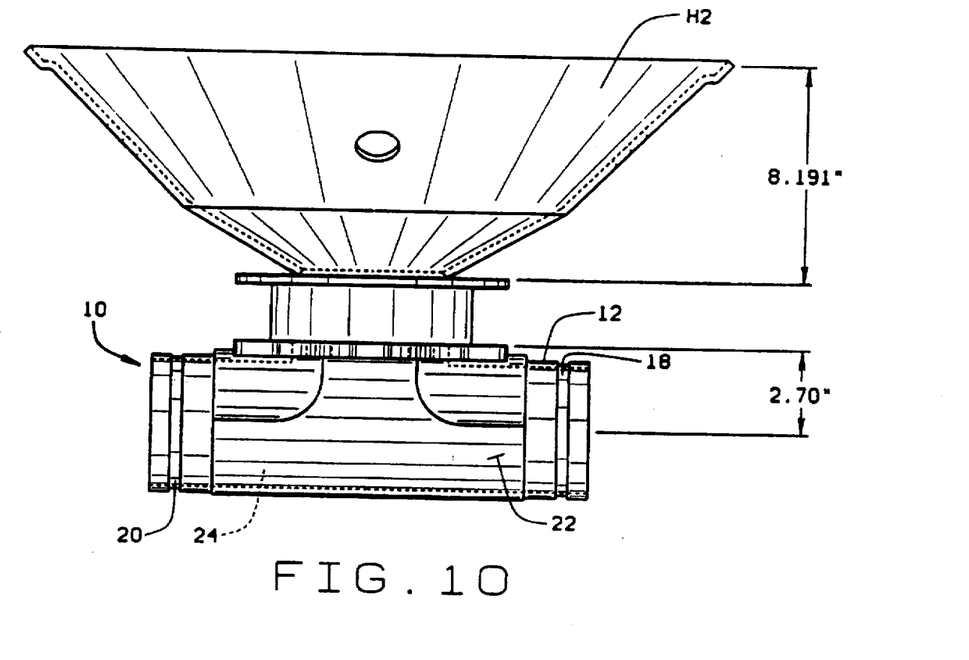
FIG. 10 is a front elevation view of the low profile hopper tee of the present invention attached to the outlet end of a 45° to 30° hopper cone.

As will be appreciated from FIGS. 9 and 10, the low profile hopper tee 10 of the present invention significantly increases the clearance between the hopper tee and the ground, when attached to a conventional hopper H1 by significantly reducing the overall length of a valve and hopper tee assembly attached to the bottom of the hopper. For example, as shown in FIG. 9, in the typical prior art hopper tee 60 the distance from the horizontal axis of pipe section 62 to the upper surface of range 64 is approximately 4.25 inches. As shown in FIG. 10, the distance from the horizontal axis of pipe section 12 to the upper surface of flange 28. This novel design results in increased clearance of approximately 1.55 inches. Also as shown in FIG. 10, by attaching the low profile hopper tee 10 of the present invention to a hopper H2 having a 45° to 30° transition angle of repose, the user can increase clearance by approximately 3.37 inches.

Figure 11:
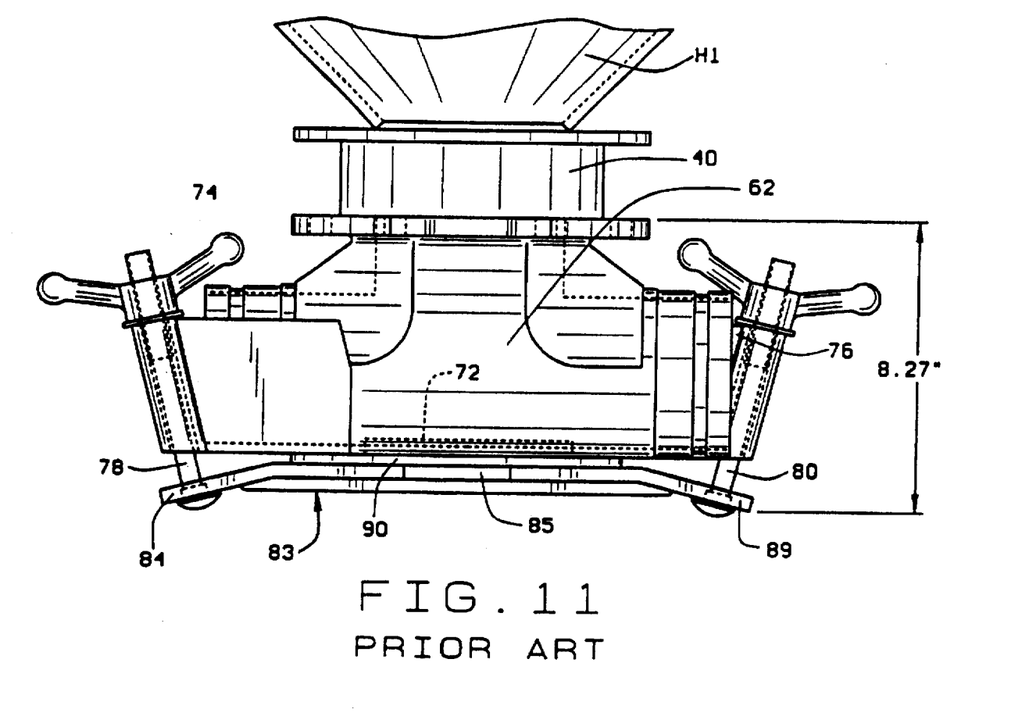
FIG. 11 is a side elevational view of a prior art drop bottom hopper tee attached to the outlet end of a hopper cone.
Figure 12:
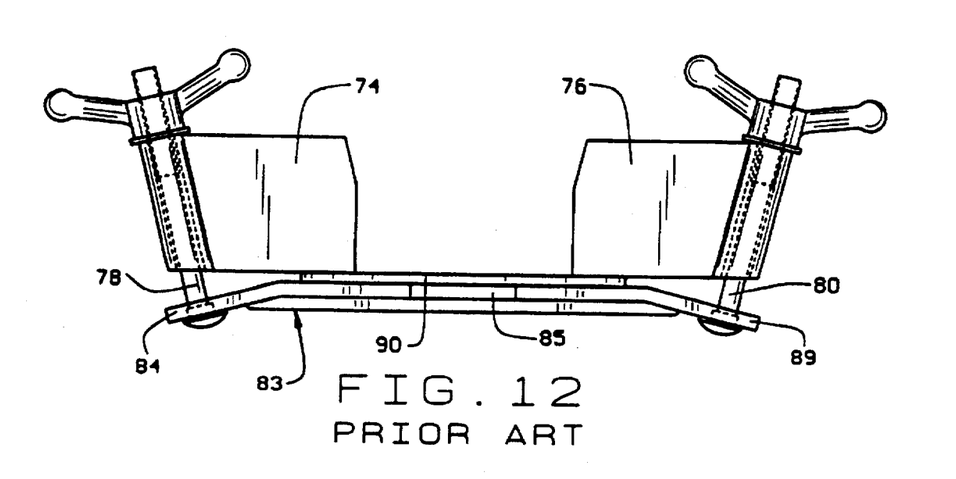
FIG. 12 is a partial side elevational view of the support arms and drop bottom door of prior art bottom drop hopper tee.

Hopper tees of the prior art have been modified to provide an opening in the bottom wall horizontal pipe section which allows for flow through the transverse pipe so as to allow emptying directly from the bottom of the hopper tee rather than through the open ends of the transverse pipe. In general, these "drop bottom" designs employ an openable or removable door that seals the bottom opening when the drop bottom is not in use. FIGS. 11 and 12 illustrate a prior art hopper tee 60 with a drop bottom design. The hopper tee 60 is constructed has a transverse pipe section 62. However, pipe section 62 has been modified to include an opening 72 formed centrally in the bottom wall of the transverse pipe section. A first support arm 74 extends out at an angle from the from side of the transverse pipe and a second support arm 76 extends out at an angle from the back side thereof. A pair of threaded fasteners 78 and 80 engaged the respective support arms and support a separate swing-away door 83 which ordinarily seals opening 72. The prior art door 83 is shown in greater detail in FIG. 12. Door 83 has a central substantially circular web 85 and a pair of ears 87 and 89 extend radially at an angle so as to align with the support arms 74 and 76. The ears 87 and 89 also angle downward and away from the hopper tee, as best seen in FIG. 11. The threaded fastener 78 and 80 engage holes (not shown) in the ears and the support arms to secure the door in place. It will be appreciated that the prior art door 83 employs a substantially circular raised gasket 90 between web 85 and the bottom opening of the hopper cone. This raised gasket increases the distance between the hopper tee transverse pipe and the bottom of door 83 as measured at the lowest point at the downwardly angled ears.

Figure 13:
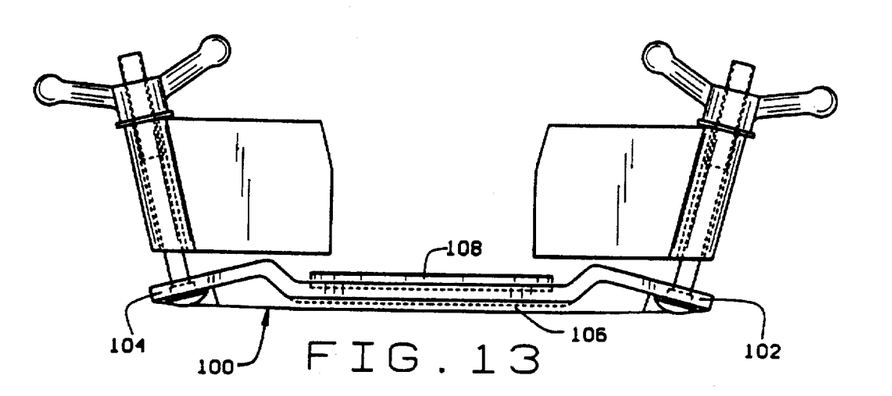
FIG. 13 is a partial side elevational view of the support arms and drop bottom door of the low profile bottom drop hopper tee of the present invention.
Figure 14:
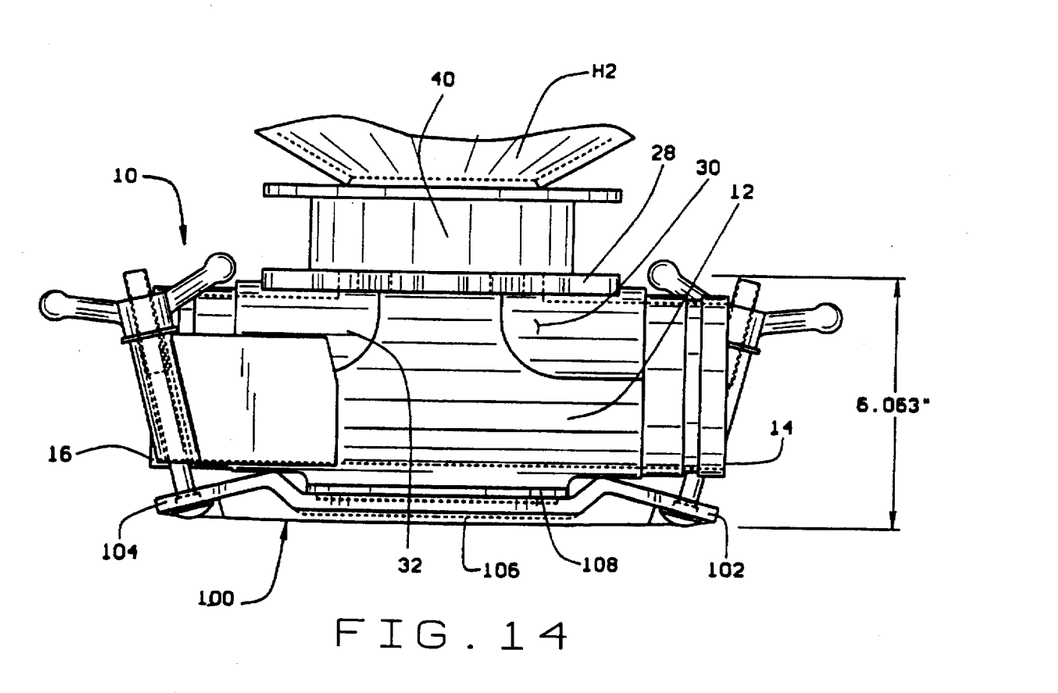
FIG. 14 is a side elevational view of the low profile bottom drop hopper tee of the present invention attached to the outlet end of a hopper cone.

The drop bottom door of the present invention, indicated generally by reference numeral 100, has a unique low profile design. As can be seen in FIG. 13, door 100 has a pair of ears 102 and 104 that extend radially from a central web 106. It will be noted that web 106 is depressed relative to the ears 102 and 104 or, in other words, the web 106 is below the plane of the ears. A sealing gasket 108 is position at the web and recessed relative to the ears. Due to this unique construction, the door 100 actually fits closer to the bottom of the hopper tee. As best seen in FIG. 14 the overall distance from the top of the hopper tee to the lowest point of door 100 is substantially less than that of the prior art door, as shown in FIG. 11.

As various changes and modifications could be made in the above constructions of the hopper tee without departing from the scope of the invention and the appended claims, the foregoing description and accompanying drawings are intended to be illustrative only and should not be construed in a limiting sense.

I claim:

1. An integral one-piece east hopper tee comprising:
   an elongated hollow pipe section extending generally transversely and terminating at opposite free ends for attachment to pipeline tubing, said elongated hollow pipe section having a cylindrical wall with a uniform inner diameter at each said free end and a generally greater diameter at a midpoint than at said free ends, said cylindrical wall having an opening formed therein at said midpoint;
   an integral flat flange at the midpoint of said elongated hollow pipe section and surrounding said opening formed in said cylindrical wall;
   wear resistant means integrally formed between said flange and said elongated hollow pipe section for increasing the wall thickness of the cylindrical wall at the juncture of the flange and the cylindrical wall.

2. The low profile hopper tee of claim 1 wherein the distance between the central longitudinal axis of the elongated hollow pipe section and a top surface of the flange is no greater than 1.25 times the distance from the longitudinal axis of the elongated hollow pipe section to the top surface of the elongated hollow pipe section at the respective free ends.

3. The low profile hopper tee of claim 1 including an inner molded lining molded in situ within the elongated hollow pipe section, said lining having a low coefficient of friction.

4. The low profile hopper tee of claim 1 having a flow-through opening formed centrally therein at a lower side of the elongated hollow pipe section and a separate swing-away door mounted to the lower side of the elongated hollow pipe section for closing off the flow-through opening, said swing-away door having a recessed gasket seated centrally therein to seal around the flow-through opening.

5. A low profile hopper tee comprising:
   a horizontally disposed, elongated hollow pipe section having a generally cylindrical wall defining a substantially cylindrical inner chamber, said cylindrical wall also defining first and second outlet ends, said cylindrical wall having an opening formed in a top side thereof approximately at the midpoint between the first and second outlet ends;
   an integral flange formed on the top side of said cylindrical wall, said flange positioned around said opening and disposed to attach to an outlet end of a hopper;
   wear saddle means on each side of said flange between said flange and said top side of said cylindrical wall for increasing the wall thickness at the juncture of said flange and said cylindrical wall; and
   said elongated pipe section having a uniform inner diameter at each outlet end that gradually increases from each outlet end to a peripheral edge of the opening formed in the top side of the cylindrical wall thereby forming a ramp means extending from said opening into said inner chamber.

6. A low profile ranged tee comprising:
   a horizontally disposed, elongated hollow pipe section having a generally cylindrical wall defining a substantially cylindrical inner chamber, said cylindrical wall also defining first and second outlet ends, said cylindrical wall having an opening formed in a top side thereof approximately at the midpoint between the first and second outlet ends;
   an integral flat flange formed on the top of said cylindrical wall, said flange positioned flush around said opening and disposed to attach to an outlet end of a hopper;
   said integral flange having a bottom surface, and said bottom surface of the flange being located at at least one of on and within the outer periphery of the exterior of the formed cylindrical wall.

* * * * *

UNITED STATES PATENT AND TRADEMARK OFFICE
CERTIFICATE OF CORRECTION

PATENT NO. : 5,676,404
DATED : October 14, 1997
INVENTOR(S) : David E. Sisk

It is certified that error appears in the above-identified patent and that said Letters Patent is hereby corrected as shown below:

Column 5, claim 1, line 56, change "east" to ---cast---.

Column 6, claim 6, line 48, change "ranged" to ---flanged---.

Signed and Sealed this

Twenty-seventh Day of January, 1998

Attest:

BRUCE LEHMAN

Attesting Officer

Commissioner of Patents and Trademarks